United States Patent [19]

Hiner et al.

[11] Patent Number: 5,444,604
[45] Date of Patent: Aug. 22, 1995

[54] LAMP ASSEMBLY FOR AN EVACUATION SLIDE

[75] Inventors: Eric M. Hiner, Plantation; Fernando J. Tages, North Lauderdale, both of Fla.

[73] Assignee: DME Corporation, Fort Lauderdale, Fla.

[21] Appl. No.: 215,308

[22] Filed: Mar. 21, 1994

[51] Int. Cl.⁶ .............................................. F21V 21/00
[52] U.S. Cl. ...................... 362/226; 362/375; 362/310; 362/362; 362/62
[58] Field of Search ............... 362/374, 375, 362, 226, 362/62, 253, 311, 310, 353, 307; 313/323, 224; 220/3.8, 4.02

[56] References Cited

U.S. PATENT DOCUMENTS

| 2,269,182 | 1/1942 | Claspy et al. | 362/375 X |
|---|---|---|---|
| 3,184,590 | 5/1965 | Nagel | 362/362 X |
| 3,218,448 | 11/1965 | Cala | 362/226 |
| 3,463,915 | 8/1969 | Day | 362/253 X |
| 3,511,982 | 5/1970 | Salter | 362/226 X |
| 3,894,205 | 7/1975 | List et al. | 439/558 X |
| 4,029,953 | 6/1977 | Natoli | 439/558 X |
| 4,466,050 | 8/1984 | Lockard | 362/375 X |
| 4,590,542 | 5/1986 | Schauwecker et al. | 362/226 X |

Primary Examiner—Ira S. Lazarus
Assistant Examiner—Thomas M. Sember
Attorney, Agent, or Firm—Malin, Haley, DiMaggio & Crosby

[57] ABSTRACT

A lamp assembly for installation on aircraft evacuation slides having a cover and a base that interlock to form a curvilinear and pliable lamp housing that is engineered from a plastic resin for light dispersement and durability, wherein in the preferred embodiment the base secures the lamp in a twist lock engagement for convenient replacement and where the base and cover together provide improved strain relief for the wire conductor.

31 Claims, 18 Drawing Sheets

LAMP ASSEMBLY FOR AN EVACUATION SLIDE

BACKGROUND OF THE INVENTION

1. Field of the Invention

The present invention relates to a lamp assembly, and more particularly, to an improved lamp assembly typically installed on aircraft evacuation slides, wherein the assembly is designed to withstand the static and dynamic forces realized when the slide is folded into a compact, volumetrically efficient package for storage and then expanded rapidly.

2. Description of the Prior Art

Inflatable evacuation slides, or rafts, are installed on substantially all passenger aircraft to allow for rapid evacuation in the event of an emergency. In the deflated state, the evacuation slide is tightly folded into a compact compartment near or within the aircraft doorway. A girth bar is extended from the inflatable evacuation slide and connected to brackets on the floor inside the aircraft doorway, such that the slide is simultaneously deployed with the opening of the door. When the door is opened, the slide is pulled from its container by the girth bar and deposited through the open doorway. The slide is then automatically inflated, making it ready for the evacuation of passengers.

Since a substantial amount of flying is done at night, it is imperative for the safety of the passengers that the slides are well lit. Therefore, illumination is provided by lamp assemblies which are mounted to the evacuation slides. The problem is that when the slides are compacted into their storage areas, tremendous forces are exerted on the housing assemblies. Similar forces are applied to the housing assemblies when the slides are deployed and expanded rapidly. Unfortunately, conventional lamp assemblies are commonly damaged and rendered inoperable under these forces, especially during emergency situations.

Conventional lamp housing designs make them highly susceptible to such damage and inefficient for maintenance purposes. For instance, the housing assemblies are fabricated from materials incapable of withstanding the higher forces realized by today's compact packing techniques. In addition, the lamp housing structures incorporate flat conductor cables that are installed with inadequate strain relief. The result is a rigid interface between the flat conductor cable and the lamp housing edges which cause the conductors and housings to crimp, break and fail under the static and dynamic forces. Moreover, time consuming procedures are required to replace and repair lamps and their housings in that the housings must be pried apart and lamps replaced by potentially injurious, hazardous, and complex soldering techniques. Thus, a more stress resistant lamp housing structure is needed, and particularly one that can be more conveniently maintained.

Improvements in the ability to create smaller, denser evacuation packages have caused structural failures in the prior art lamp enclosures and ultimately cause lamp breakage. Furthermore, the prior art lamp housing conductor is a flat conductor cable. The interface of the flat conductor cable and the prior art lamp housing has caused conductor failures since the prior art lamp housings do not effectively strain relieve the flat conductor, particularly when the prior art design is used in new, smaller, denser evacuation packages. Consequently, there remains a need for a more curvilinear and pliable lamp housing structure. The present invention solves these problems by providing in the preferred embodiment a housing that is able to secure the lamp without soldering, and by providing a lamp housing conductor that is a round conductor cable, while absorbing the static and dynamic forces encountered today without failing.

SUMMARY OF THE INVENTION

The present invention provides an improved lamp housing assembly that has increased durability and convenience for mounting to aircraft evacuation slides or the like. The lamp housing comprises a cover or top housing, and a base or bottom housing which adaptably mate and couple to each other in interlocking engagement, such that the cover is superposed over the base. In the preferred embodiment, The base defines a lamp receiving aperture which secures the lamp in twist lock engagement so that the lamp may be easily installed and replaced. Meanwhile, the cover defines a lamp compartment with cylindrically recessed levels that align and mate with the base and lamp combination. The base and cover are injection molded and made of a plastic resin for ease of manufacture and for adequate light dispersement from the lamp.

The cover has at least two sides and opposite end segments, wherein at least one end segment defines an arcuate depression. The base has at least two sides and opposite end segments, wherein at least one of the base end segments defines a complimentary arcuate protrusion, such that the cover's arcuate depression receives the base's arcuate protrusion. The cover also includes rounded outer surfaces which blend with the arcuate depressions to form the classical "S" shaped strain relief feature and maintain the minimum bend radii for the conductor and insulation used in the wire when the top and bottom housings are snapped together. Thus, the conductive wire bends around the arcuate protrusion and rounded outer surface when the base and cover are coupled to effectuate the strain relief that prevents the wire from becoming fatally deformed.

The complete housing is formed by the interlocking of the cover and base. The cover includes a flange or lip longitudinally disposed along the inner surface of its two sides, the flanges being resilient and biasing. The base includes complimentary grooves along the outer surface of its two sides for receiving the flange of the cover, thereby providing a snap fit or snap lock feature. The flanges deflect slightly then recover as the cover fits into the grooves of the base. The housing's snap fit feature is designed to accommodate without failure the static and dynamic forces encountered by the housing both when the evacuation slides are folded into tight, volumetrically efficient packages and when the slides are rapidly expanded. In addition, the outer surfaces of both the cover and base have rounded edges to avoid puncturing the slide.

Assisting the snap fit feature in its function are alignment openings in the base and corresponding guide pins in the cover. These openings accept the guide pins which protrude from the interior of the cover and align the cover and base for assembly. Longitudinal movement of the cover and base relative to each other is also minimized by the alignment feature.

As noted above, in the preferred embodiment, the lamp is secured within a receiving aperture defined by the base and is supplied power through a conductive wire harness. In the preferred embodiment, the conductive wire harness is in the form of round wire. The conductive wire harness interposes the cover and the base as it passes through the housing assembly and is secured therein by a wire guide in the cover which captures the round wire and holds it in its intended position within the lamp housing assembly. At least two insulation displacement terminals, or splicing terminals, are fixedly and/or integrally secured to the interior of the base such that they protrude in an upward direction. The splicing terminals electrically communicate with the lamp through circuit paths at one end and include a cutting edge at the other end for splicing through the wire harness insulation to allow direct contact with the wire. Consequently, the conductive wire harness and the lamp are in electrical contact with one another, thereby providing continuity without the need for soldering the lamp leads to the wire harness. The conductive wire harness is connected to a power source on the evacuation slide or on the aircraft. In the preferred embodiment, the lamp is removable for easy maintenance.

In an alternative embodiment, the lamp may be non-removable without departing from the scope of the instant invention. The important aspect of providing a curvilinear and pliable lamp housing that is able to accommodate the static and dynamic forces encountered by the housing and which is conducive to modern aircraft needs is still obtained. In this embodiment, as in the preferred embodiment, no soldering is necessary, and the snap fit feature allows for the easy removal and replacement of the lamp. Furthermore, the S-shaped strain relief feature is incorporated. In an additional embodiment, the housing is designed to accommodate a flat cable conductor. In this embodiment, the lamp leads must be soldered to the flat conductive cable to provide continuity. However, the aforementioned S-shaped strain relief feature is still incorporated, thereby eliminating all sharp edges and incorporating curvilinear lines. Furthermore, in this embodiment, the guide pins penetrate the conductor when the cover and base are interlocked, thereby locking the conductor in place. Additionally, the snap fit feature allows for the easy removal and replacement of the lamp.

An improved lamp housing assembly is provided with the present invention which vastly reduces the instances of a lamp housing structure failure due to the forces applied to the lamp housing assembly when the evacuation slide is folded into a tight, volumetrically efficient package. The lamp housing assembly is designed to resolve all the technical challenges that have evolved in providing an inexpensive convenient and durable lighting fixture for aircraft evacuation slides.

Accordingly, it is a primary object of the present invention to provide a lamp housing assembly which can withstand the static and dynamic forces applied to all surfaces of the lamp housing assembly when an evacuation slide is folded into tight, volumetrically efficient packages that are then installed in aircraft doorways.

It is an additional object of the present invention to provide a lamp housing assembly with effective strain relief features such that the interface between the conductor cable and the lamp housing does not cause conductor failure.

It is a further object of the present invention to provide a lamp housing assembly which is designed to mount on an inflatable evacuation slide such that it does not cause or contribute to a puncture of the inflated membranes.

It is yet another object of the present invention to provide a lamp housing assembly wherein the lamp is easily replaceable.

It is yet still another object of the present invention to provide a lamp housing assembly with a snap fit feature, allowing for ease of alignment and locking engagement between the cover and the base of the housing.

In accordance with these and other objects which will become apparent hereinafter, the instant invention will now be described with particular reference to the accompanying drawings.

DESCRIPTION OF THE PREFERRED EMBODIMENTS

Figure 1:
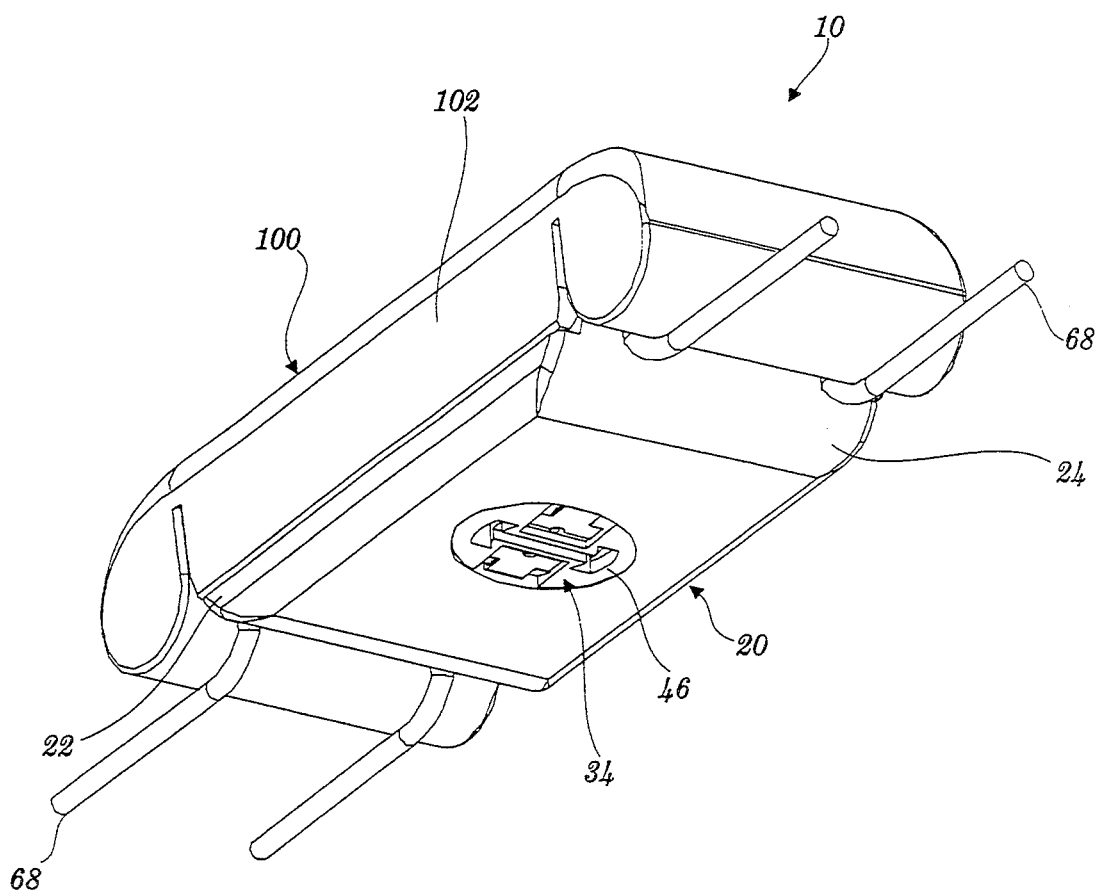
FIG. 1 is a perspective view of the preferred embodiment of a lamp housing assembly with a round wire conductor and with a removable lamp.

With reference to the drawings, FIGS. 1-24 depict a lamp housing assembly generally indicated by the reference numeral 10. Throughout the figures, like referenced characters are used to indicate like elements.

Figure 2:
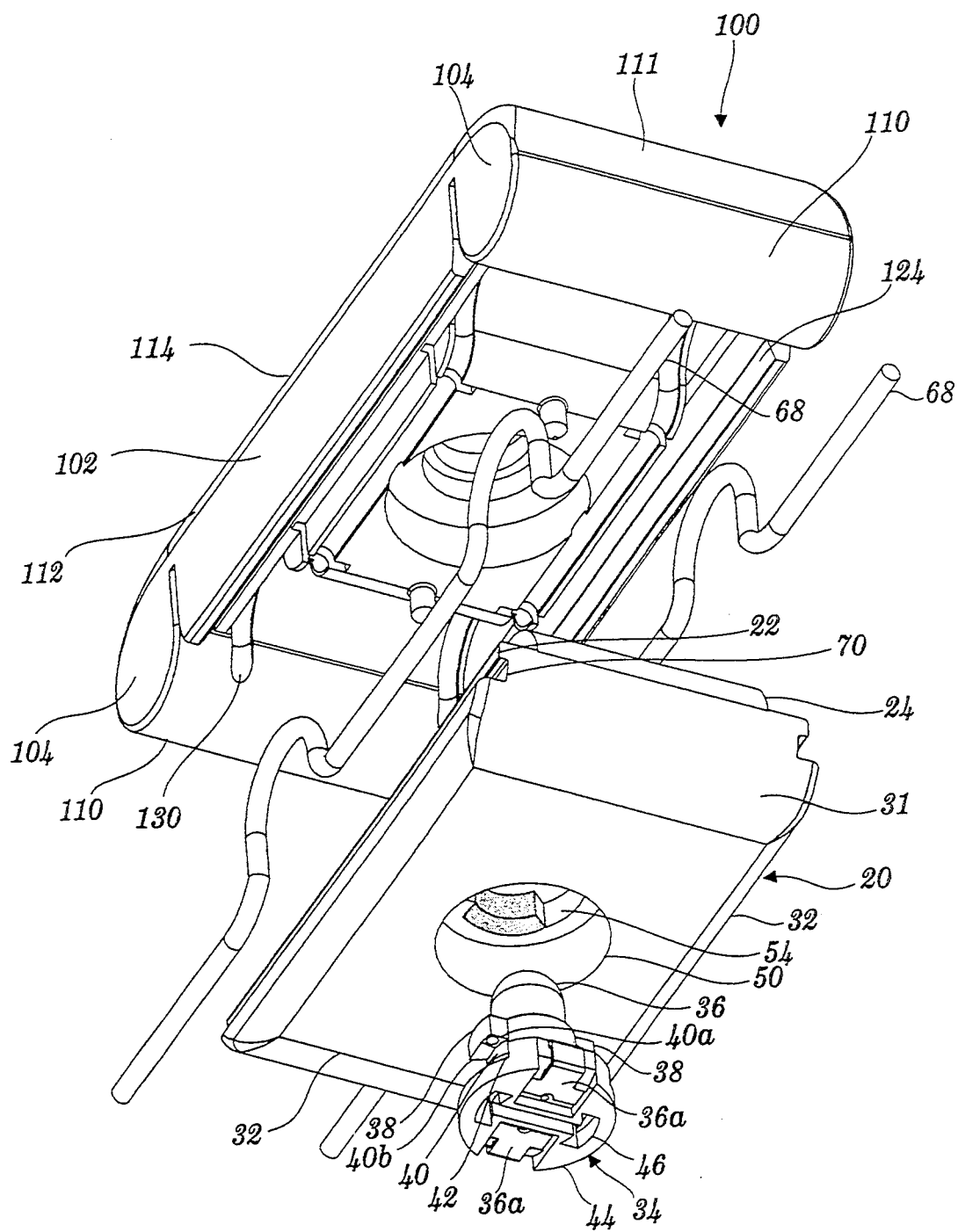
FIG. 2 is an exploded view of the preferred embodiment of the lamp housing assembly.
Figure 4:
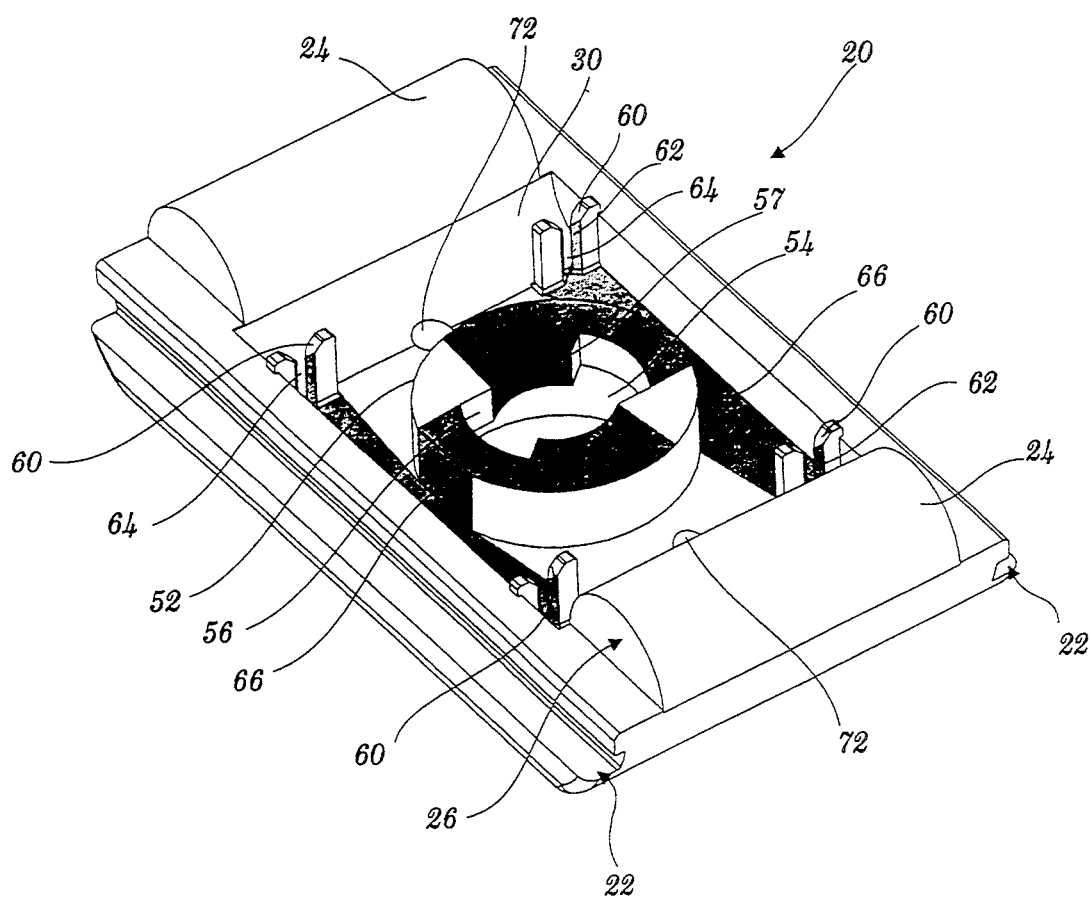
FIG. 4 is a perspective view of the interior of the base or bottom housing of the preferred embodiment of the lamp housing assembly.
Figure 5:
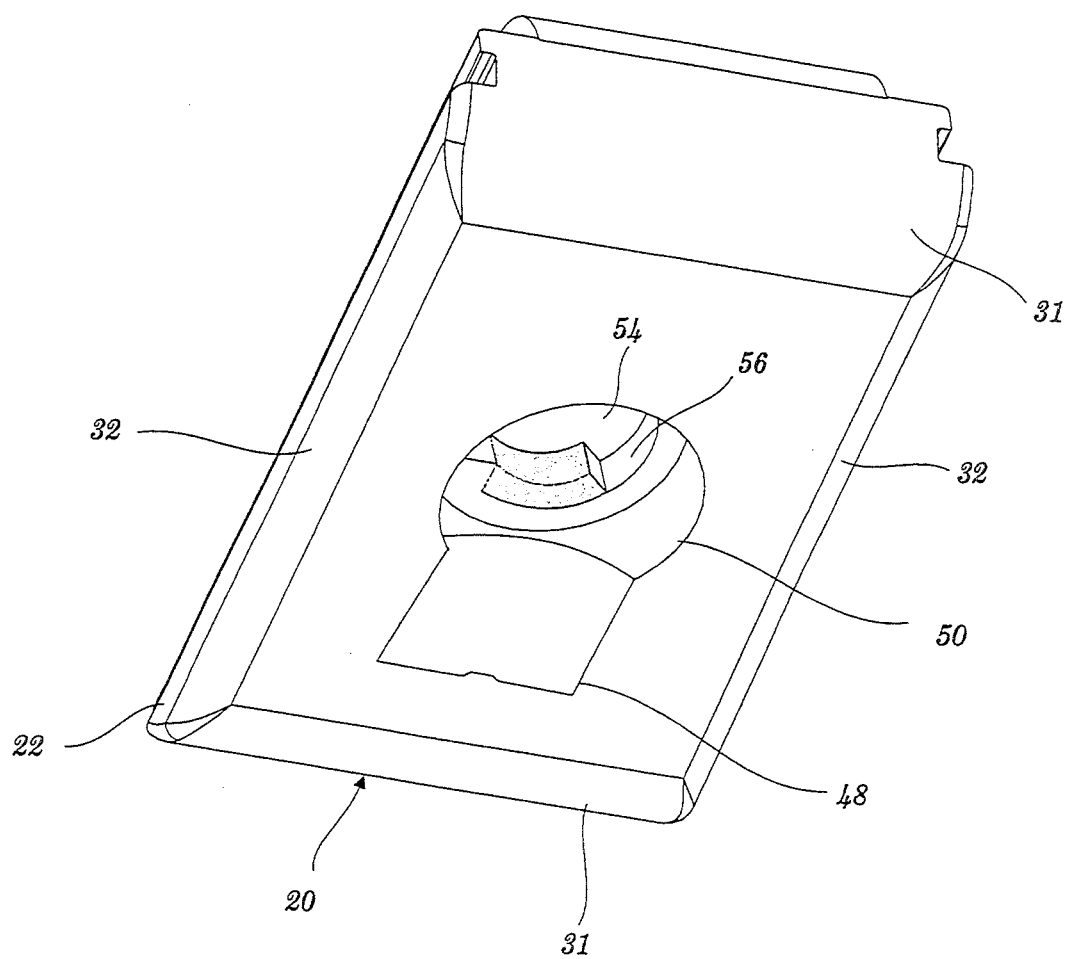
FIG. 5 is a perspective view of the exterior surface of the base for the preferred embodiment.
Figure 6:
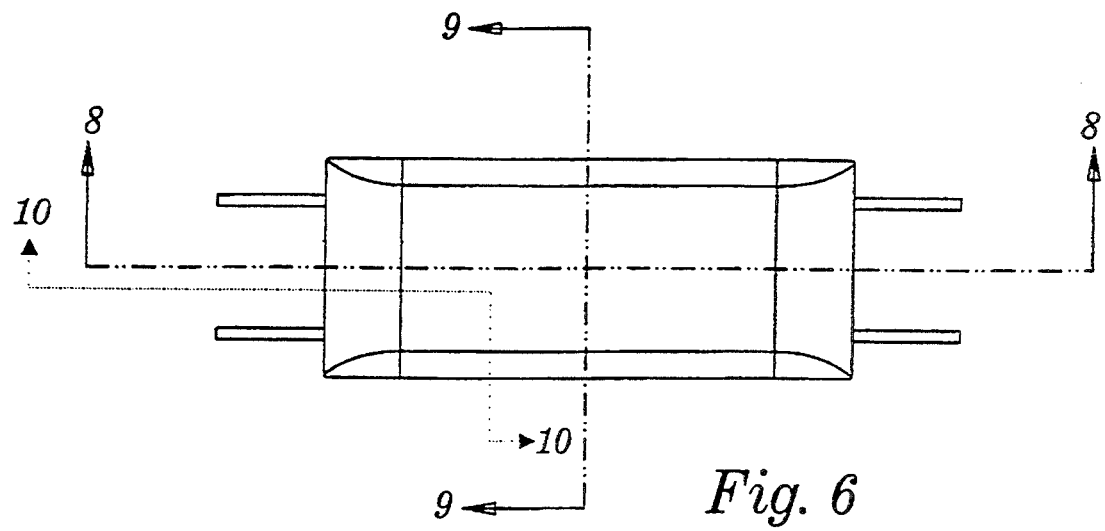
FIG. 6 is a top plan view of the preferred embodiment of the lamp housing assembly.

Referring now to FIG. 1, the lamp housing assembly 10 of the present invention is shown. The lamp housing assembly generally comprises a bottom housing 20, a top housing 100, a lamp assembly 34, and conductor wire 68. In the preferred embodiment, the bottom housing 20, or base, and the top housing 100 or cover, are coupled in interlocking engagement and the lamp assembly 34 is removable and is also interlocked into the base 20 for easy replacement. As shown in FIGS. 2, 4, and 5, the base 20 includes sides 22 and opposite end segments, wherein at least one end segment defines an arcuate protrusion 24. The base 20 may be injection molded with an engineered plastic resin that is capable of being plated with copper using photo lithographic techniques. The plating of copper on the plastic allows electrical circuit paths 66 to be laid out along an inner surface of the base. The copper also forms the base metal for further plating using a tin/lead alloy or gold on tin/lead alloy plating to improve solderability and corrosion resistance, respectively. The circuit paths 66 electrically interface the negative and positive 36a leads on the lamp assembly 34 with negative and positive leads of the conductor wire 68, respectively, transmitting power from an external source. In the preferred embodiment, the negative and positive leads 36a are in the form of plated copper which is electrically connected to a lamp turret via the circuit.

As seen in FIGS. 1 and 2, an annular aperture 50 is defined by the base 20, thereby allowing the lamp assembly 34 to be installed in an upright position in the base 20. The upright position of the lamp assembly 34 optimizes the light distribution of the lamp 36. The annular lamp aperture 50 is designed to accept the lamp assembly 34 and allow the lamp assembly 34 to be locked into the base 20. As best seen in FIG. 2, the lamp assembly 34 generally comprises a lamp 36, a lamp engagement member 38, and a lamp base 44. Lamp engagement member 38 contains a formed interlocking groove 40 wherein the interlocking groove 40 has a leading edge 40a and a trailing edge 40b, the trailing edge 40b containing a stop 42 for limiting rotation of the lamp assembly 34 and thereby locking the lamp assembly 34 to the base 20, which will be described in greater detail hereinafter.

Referring now to FIG. 5, a lamp assembly access panel 48 may be molded into the bottom side of the base 20 to allow lamp assembly 34 to be removed when it is rotated to an unlocked position using a flat blade screwdriver which fits the slotted recess 46 in lamp base 44. For lamp assembly removal, a screwdriver blade is inserted parallel to access panel 48 and a screwdriver blade is then used to gently lever the lamp assembly out of the base 20 once the lamp assembly 34 has been unlocked. The words "locked," "unlocked," and a rotational arrow symbol may be molded into the bottom surface of the base 20. When the slotted recess 46 is aligned with the words "locked," or "unlocked," the identified position has been achieved.

Figure 10:
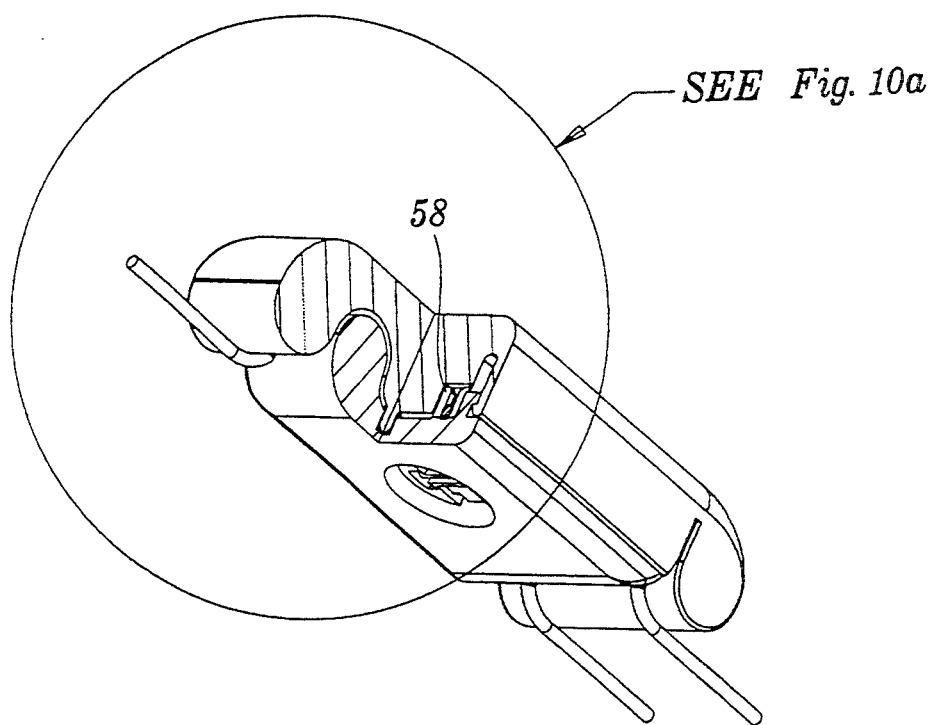
FIG. 10 is a partial cut away view of the preferred embodiment of the lamp housing assembly taken along line 10—10 of FIG. 6.
Figure 10A:
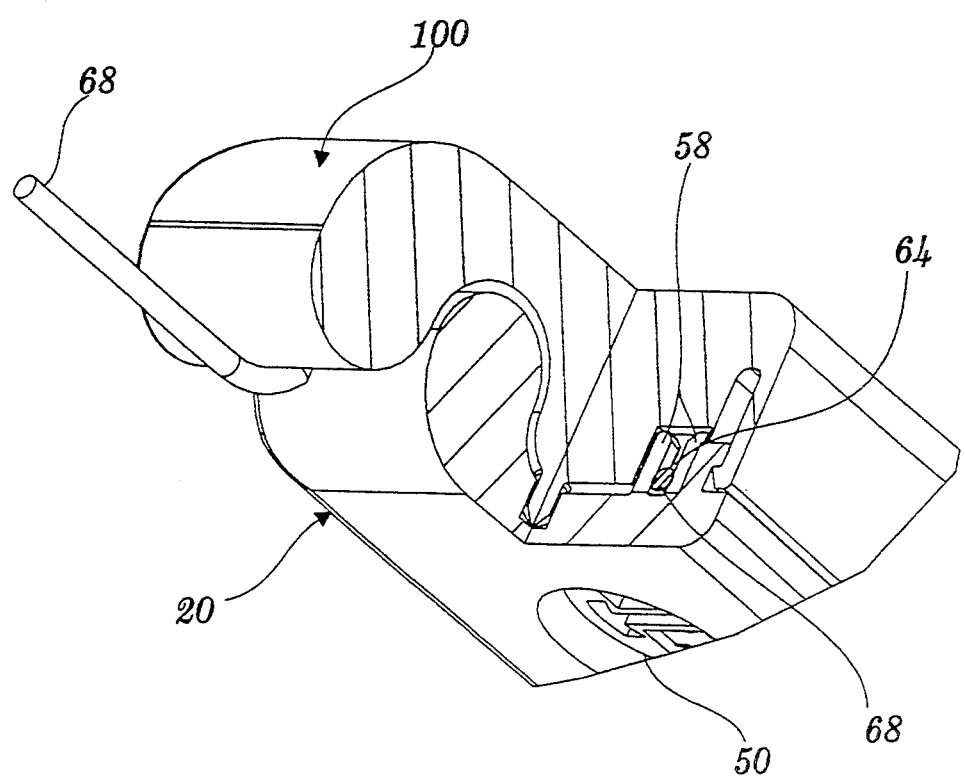
FIG. 10A is a detailed view of FIG. 10.
Figure 11:
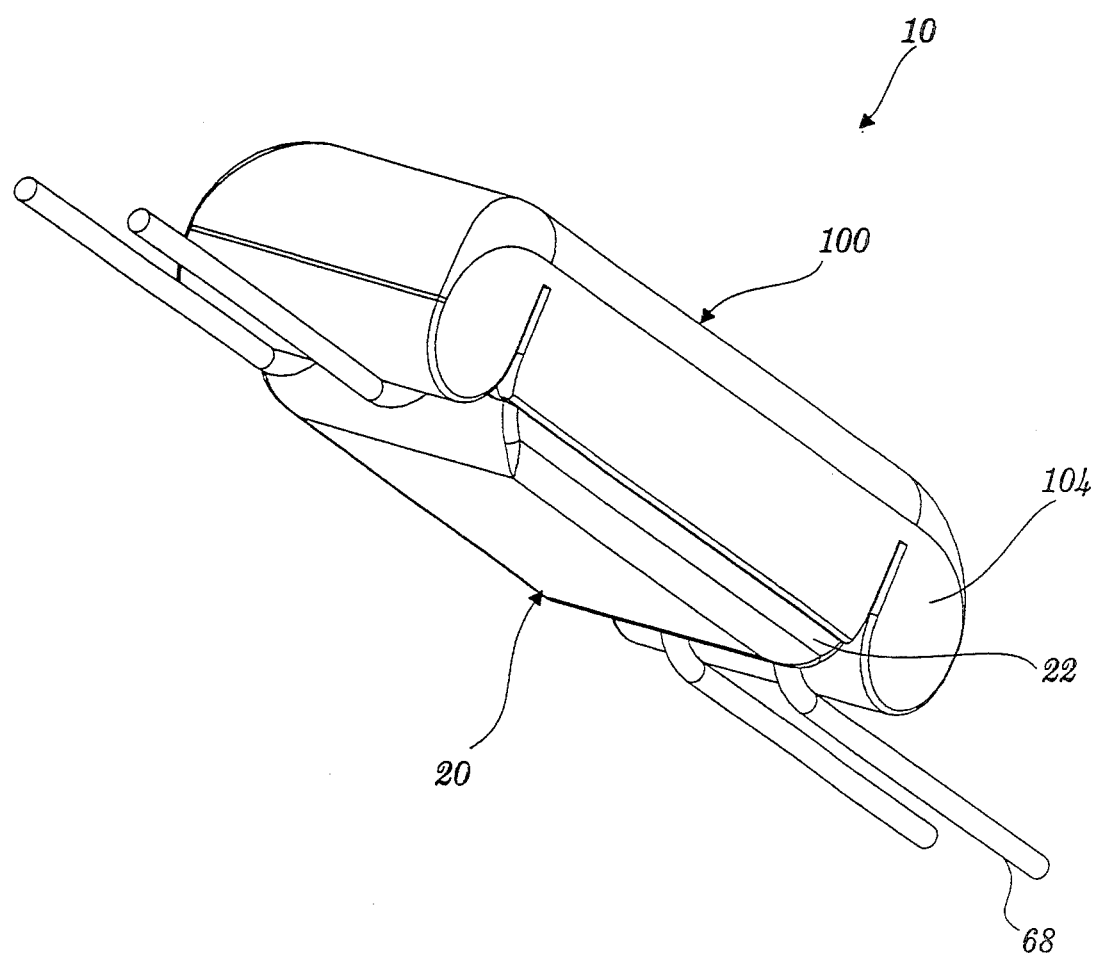
FIG. 11 is a perspective view of an alternative embodiment of the instant invention with a round wire conductor and with a non-removable lamp assembly.
Figure 12:
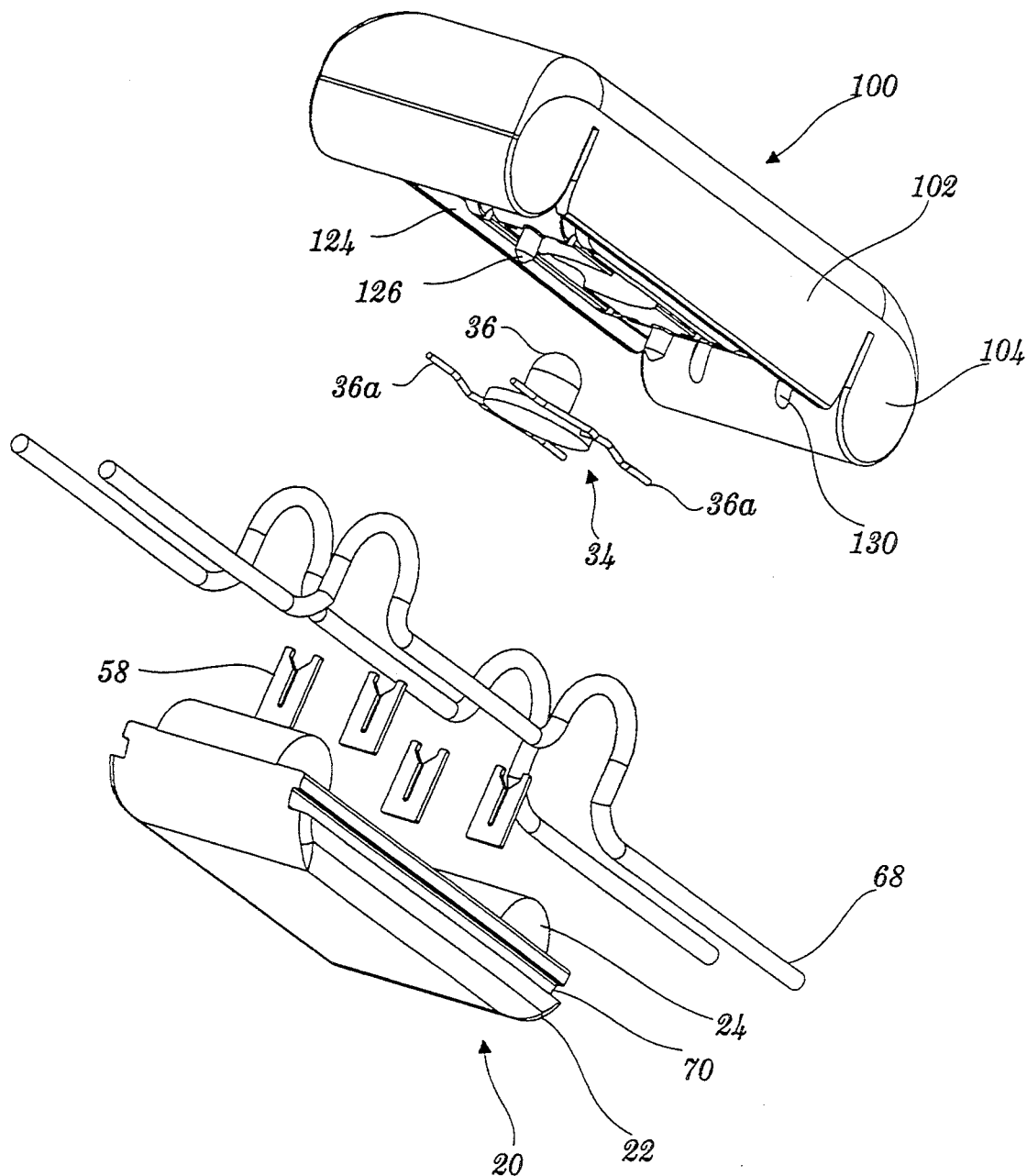
FIG. 12 is an exploded view of the second embodiment of the instant invention.
Figure 13:
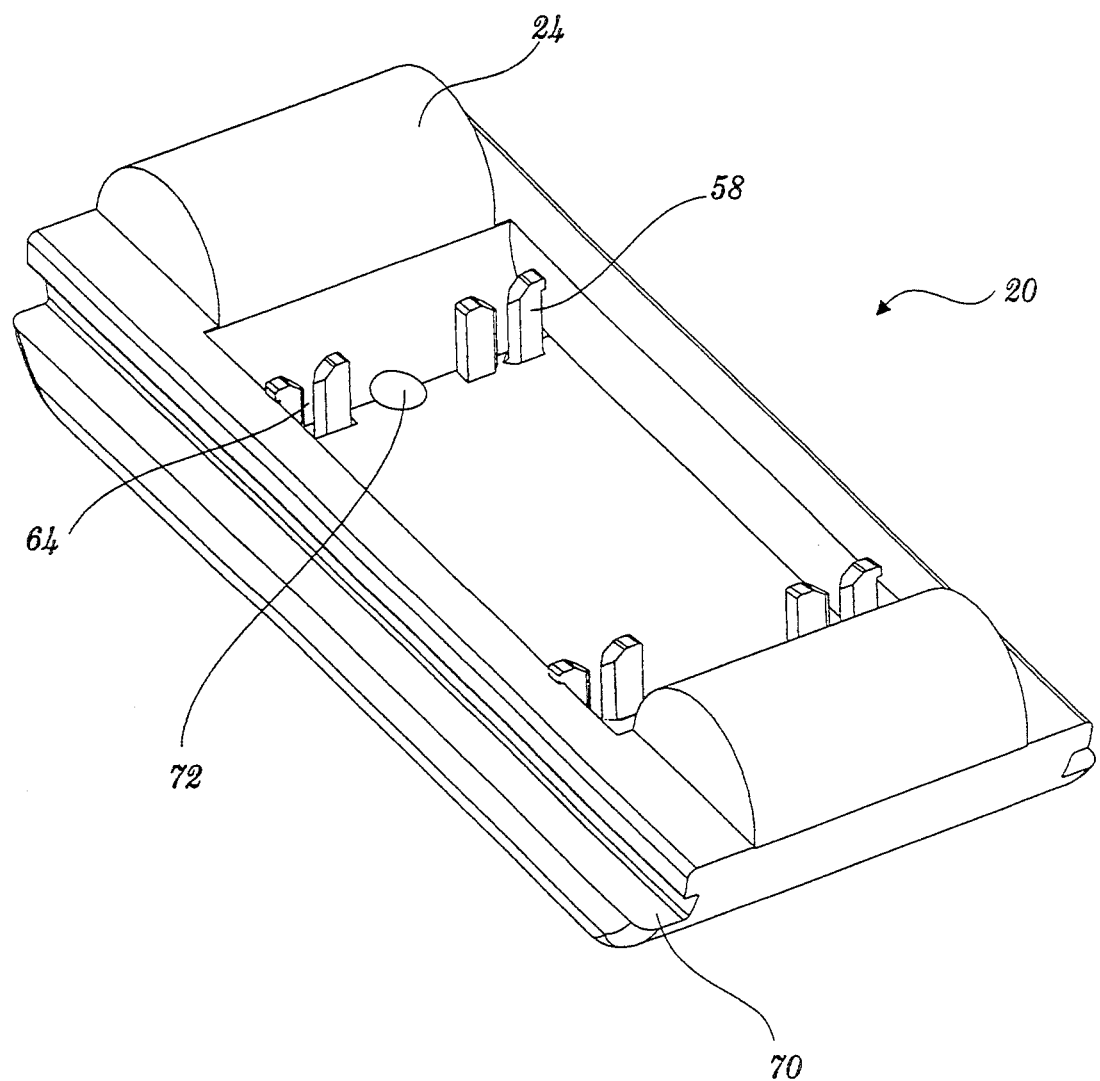
FIG. 13 is a perspective view of an interior portion of the base of the second embodiment.
Figure 14:
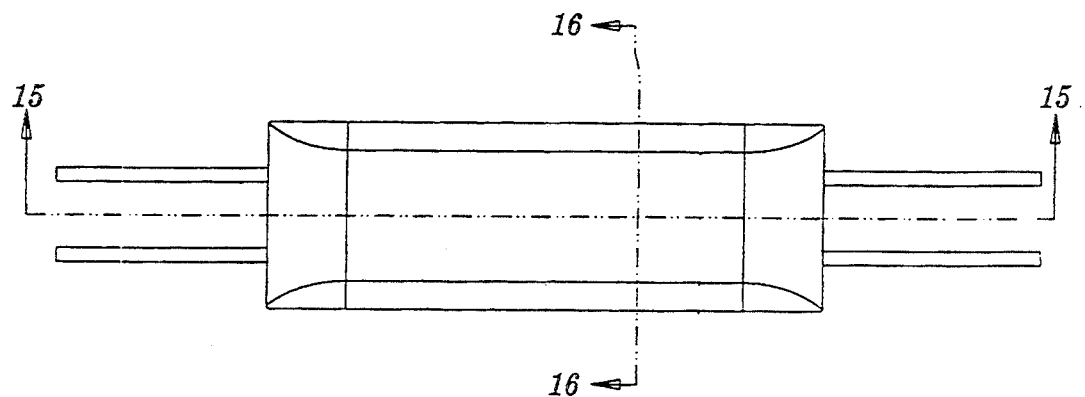
FIG. 14 is a top plan view of the second embodiment of the instant invention.
Figure 15:
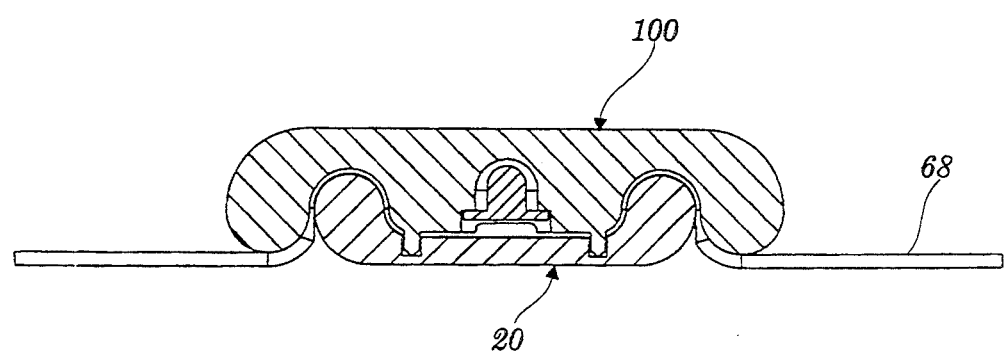
FIG. 15 is a cross sectional view of the second embodiment taken along line 15-15 of FIG. 14.
Figure 16:
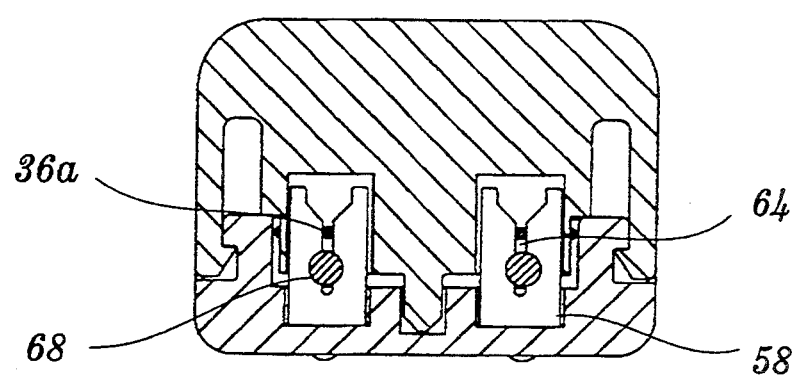
FIG. 16 is a cross sectional view of the second embodiment of the lamp housing assembly taken along line 16-16 of FIG. 14.
Figure 17:
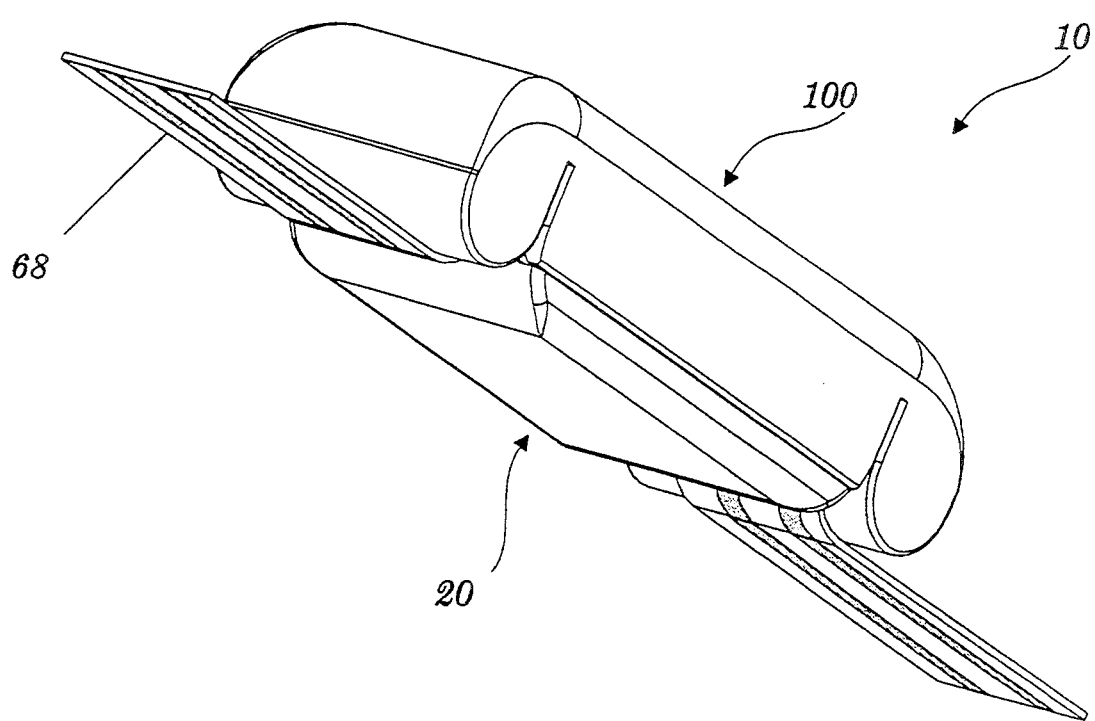
FIG. 17 is a perspective view of a third embodiment of the instant invention illustrating the use of flat conductor cable.

Referring now to FIGS. 4, 10 and 10a, base 20 further includes insulation displacement terminals, or splicing terminals, 58. The insulation displacement terminals 58 are used to remove the insulation from a stranded, round wire of a specific gauge. The terminals 58 can be sized for a wide range of wire gauges. Splicing terminals 58 include wire lead-ins 60, displacement edges 62, and wire slot 64. As the conductor 68 engages the splicing terminal 58, wire lead-in 60 guides conductor 68 through displacement edge 62, where conductor 68 is spliced, and inserted into wire slot 64. Terminals 58 are conductively plated and engage the conductor wire 68, thereby creating an electrical circuit. Wire conductors 68 are connected to a primary, electro chemical, multiple cell, power unit and are used to carry the current to the lamp assembly 34 installed in the housing. The position of the insulation displacement terminals 58 is driven by the physical dimensions of the wire conductors 68, the lamp 36 and the cold temperature operating environment that dictates the minimum bend radius for the wire insulation to maintain its dielectric properties and for the copper conductor to maintain its mechanical properties.

With reference to FIGS. 2, 4, 5, 8 and 9, the base 20 further includes a lamp turret 52 having a lamp attaching aperture 54 disposed therein and the lamp attaching aperture 54 having recessed areas or notches 56. As previously mentioned, annular aperture 50 is molded into the base 20, allowing the lamp assembly 34 to be installed upright therein. The annular aperture 50 is designed to accept lamp assembly 34 and allow the lamp assembly 34 to be locked into the base 20. Recessed areas 56 form a lip 57, such that lamp engagement member 38 is engaged with recessed area 56 when the lamp assembly 34 is inserted and rotated with a flat blade screwdriver in slotted recess 46. To lock lamp assembly 34 into place, lamp assembly 34 is inserted by hand through annular aperture 50 and locked into the base 20 using a flat blade screwdriver that fits the slotted recess 46 in the lamp base 44. By rotating lamp assembly 34 with a screwdriver, interlocking groove 40 engages the lip 57 until stop 42 is reached, thereby locking lamp assembly 34 to the base 20.

The lamp turret 52 height establishes the lamp filament location within the housing. The lamp filament location is an important optical characteristic of the lamp 36 and lamp housing. The turret height 52 can be increased to change the hemispherical distribution of the light and with changes in the top housing or cover 100 the optical characteristics of the lamp housing assembly can be modified to suit other applications.

As seen in FIGS. 2, 3, 4 and 5, snap fit features are molded in the sides of the base 20 and cover 100. These snap fit features include grooves 70 as defined by the exterior of sides 22 in the base and flanges 124 as defined by sides 102 in the cover. Flanges 124 run longitudinally along the interior of sides 102 and are resilient so that they recover when slightly compressed after being received by grooves 70. The slight deflection in the flange 124 allows the side 102 to give and retract providing alignment and locking engagement of the cover 100 and base 20. As noted above, the lamp housing assembly 10 is installed on evacuation slides that are folded into tight volumetrically efficient packages that are installed in aircraft doorways. When the aircraft door is opened in an emergency the evacuation slide inflates rapidly. In the evacuation slides' packed state, static and dynamic forces are applied to the materials of the slide, including the lamp housing assembly 10. These forces are relatively high and can increase during aircraft operations and crashes. The lamp housing cover and base snap fit features have secure interlocking characteristics which can withstand the static and dynamic forces without the lamp housing structure failing.

Figure 3:
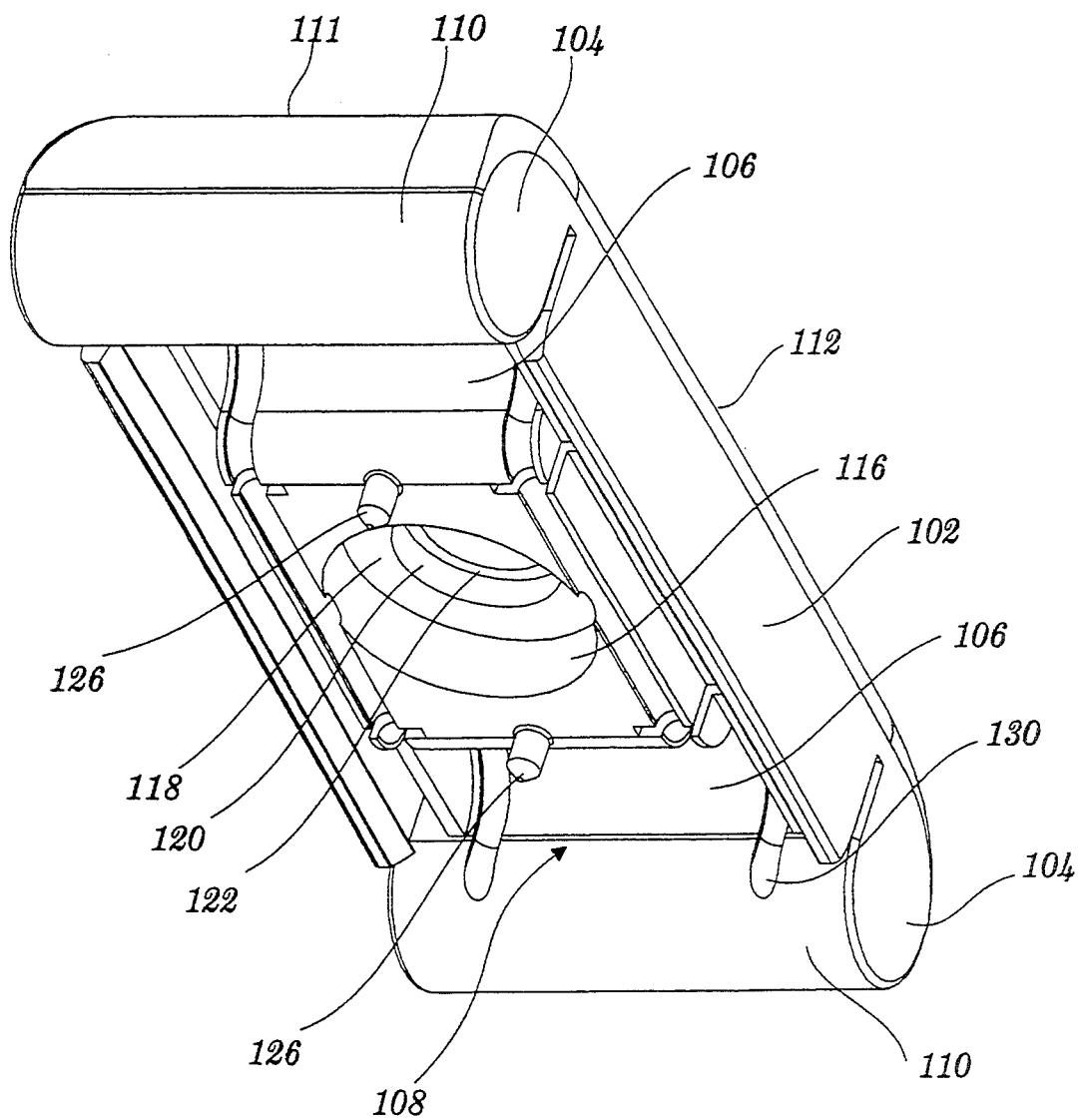
FIG. 3 is a perspective view of the interior of the cover or top housing of the preferred embodiment of the instant invention.

As seen in FIGS. 3 and 4, assisting the snap fit features in their function are alignment recesses 72 in the base 20. These recesses 72 accept guide pins 126 of the cover 100 to align the cover 100 and base 20 and constrain the longitudinal movement of the cover 100 and the base 20 relative to each other. In addition, alignment of splicing terminals 58 with displacement terminal recesses 128 in the cover is also achieved.

As seen in FIG. 4, the profile radius 26 of protrusion 24 and the wire transition radius 30 of the base 20 are complimentary to provide strain relief and maintain the minimum bend radii for the wire conductor 68 when the cover 100 and base 20 are snapped together. The point is to provide smooth transitions for the wire 68. The surface of the profile radius 26 may be textured to provide some additional wire strain relief. As seen in FIG. 5, the external edge radii 32 and the opposite end radii 31 are also rounded off, in order to prevent puncturing the slide.

Figure 7:
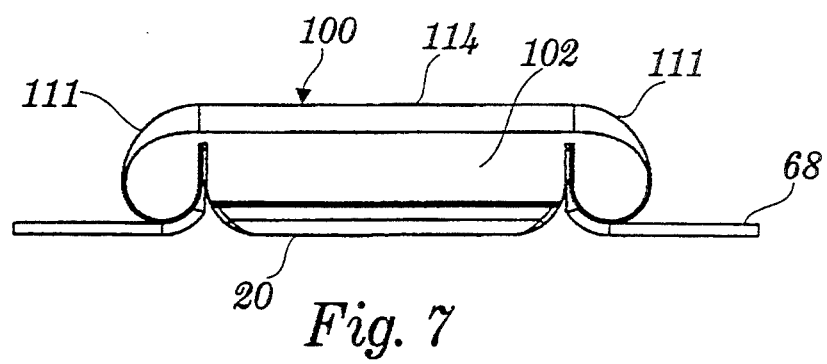
FIG. 7 is a side view of the preferred embodiment of the lamp housing assembly.
Figure 8:
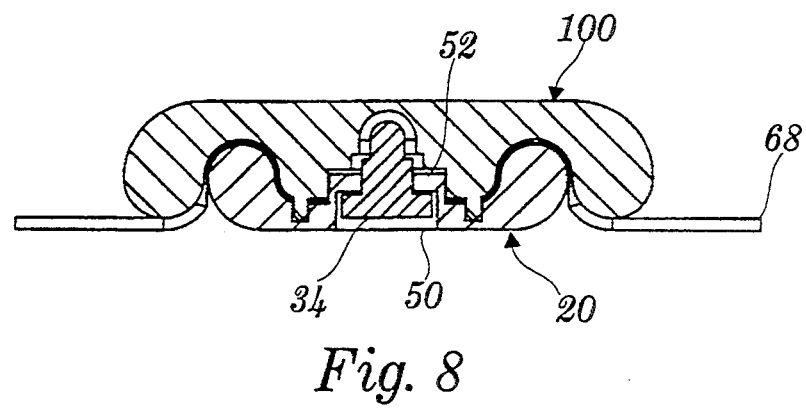
FIG. 8 is a cross sectional view of the preferred embodiment of the lamp housing assembly taken along line 8—8 of FIG. 6.
Figure 9:
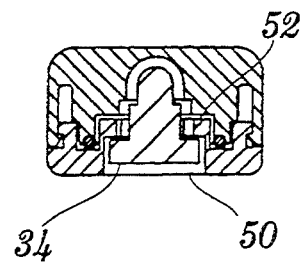
FIG. 9 is a cross sectional view of the preferred embodiment of the lamp housing assembly taken along line 9—9 of FIG. 6.

In FIGS. 1, 3, and 7, the cover 100 is shown, generally comprising sides 102 and opposite end segments or lobes 104, wherein at least one end segment 104 defines an arcuate depression 106 on its interior surface for adaptably receiving or mating with its complimentary counterpart the base arcuate protrusion 24. As can be seen in FIGS. 2 and 7, the cover 100 is rounded along its end radii 111, at its external edge radii 112 and its top surface 114, again to prevent puncturing. Wire guide 130 is a groove disposed in the interior of cover 100 along opposite sides 102. Wire guide 130 also runs along the arcuate depression 106 and captures the round wire conductor 68 to hold it in its intended position within the lamp housing assembly 10. The surface area of wire guide 130 may be textured to increase the contact area clamping the wire insulation. This texturing improves the strain relief performance of the exit radii 110 and 26 of the cover and base respectively, when teflon insulation is used on the round wire 68. When flat conductor is used, the exit radius 110 of the cover may be textured to provide additional strain relief, and the wire guide 130 is eliminated.

As seen in FIG. 3, the interior of cover 100 forms a lamp compartment 116 shaped to accept the lamp 36 and to retain any glass fragments if the lamp 36 is broken. The lamp compartment 116 comprises a first cylindrically recessed level 118 for receiving the lamp turret 52, a second recessed level 120 for receiving the lamp engagement member 38, and a third recessed level 122 for receiving the lamp 36.

As seen in FIG. 3, the profile radius 108 of the cover 100 maintains the classical "S" shape strain relief feature. The exit radius 110 of the cover 100 and the profile radius 26 of the base 20 define the wire or flat conductor path within the lamp housing assembly 10. The end radius 111 of the cover 100 provides an acceptable bend radius for the conductor used for all operational environmental extremes. The external edge radius 112 of the cover 100 protects the inflatable evacuation slide from punctures by being somewhat tapered and creates a smooth surface transition that eliminates stress risers in the plastic materials that would decrease the overall strength of the lamp housing assembly. The external edge radius 32 of the base 20 performs the same function. The top surface 114 of the cover 100 may be left smooth or textured to disperse the light emanating from the lamp. The top surface 114 may also be shaped into convex, concave, or combinations of convex and concave surfaces for specific light focusing effects. As aforementioned, the lamp turret 52 of the base 20 can be lengthened to change the position of the lamp filament. The modification of lamp turret 52 would cause the top surface 114 of cover 100 to also change. These changes can be made without effecting the original wire, insulation displacement terminals or base design. It should be noted that this only holds true for the round wire conductor embodiment.

Referring now to FIGS. 11–16, a second embodiment of the instant invention is shown with a round wire conductor and with a non-removable lamp assembly. As described earlier, the lamp housing assembly generally comprises a bottom housing 20, a top housing 100, a lamp assembly 34, and conductor wire 68. The bottom housing 20 and the top housing 100 are coupled in interlocking engagement. Snap fit features are molded in the sides of the bottom housing or base 20 and the top housing or cover 100. These snap fit features include grooves 70 as defined by the exterior of sides 22 in the base and flanges 124 as defined by sides 102 in the cover. Assisting the snap fit features in their function are alignment recesses 72 in the base 20. These recesses 72 accept guide pins 126 of the cover 100, to align the cover 100 and base 20 and constrain the longitudinal movement of the cover 100 and the base 20 relative to each other. In addition, alignment of splicing terminals 58 with displacement terminal recesses 128 in the cover is also achieved. The conductive wire harness 68 interposes the cover 100 and the base 20 as it passes through the housing assembly and is secured therein by a wire guide channel 130 in the cover 100 which captures the round wire 68 and holds it in its intended position within the lamp housing assembly. As previously mentioned, the insulation displacement terminals 58 are used to remove the insulation from a stranded, round wire of a specific gauge, wherein conductor 68 is inserted into wire slot 64. However, it should be noted that in this embodiment, the lamp assembly 34 has wire lamp leads 36a rather than the copper plated lamp leads of the preferred embodiment. Therefore, it is not necessary to plate the base 20 with copper to form electrical circuit paths as in the preferred embodiment. However, the base 20 may be so plated if desired. Insulation displacement terminals 58 are conductively plated and engage the conductor wire 68, thereby creating an electrical circuit. Furthermore, wire lamp leads 36a are inserted into wire slot 64 along with conductor wire 68, thereby creating an electrical circuit.

As discussed above in the preferred embodiment, the cover of the second embodiment has at least two sides 102 and opposite end segments 104, wherein at least one end segment defines an arcuate depression 106. The base similarly has at least two sides 22 and opposite end segments, wherein at least one of the base end segments define a complimentary arcuate protrusion 24, such that the cover's arcuate depression 106 receives the base's arcuate protrusion 24. The cover also includes rounded outer surfaces which blend with the arcuate depressions to form the classical S-shaped strain relief feature, and maintain the minimum bend radii for the conductor and insulation used in the wire when the top and bottom housing are snapped together. In this second embodiment, as in the preferred embodiment, no soldering of wire lamp leads directly to the conductor wire is necessary, and the snap fit feature allows for the easy removal and replacement of the lamp should a lamp failure occur. In addition, as discussed for the preferred embodiment above, the outer surfaces of both the cover and base have rounded edges to avoid puncturing the slide.

Essentially, the only difference between the preferred embodiment and the second embodiment is that the lamp assembly of the second embodiment is not as easily removable as the lamp assembly of the first embodiment. No annular aperture is provided in the base of the second embodiment, and the lamp turret is also not included in the second embodiment. Otherwise, the top housing and the bottom housing of the preferred embodiment and the second embodiment are essentially the same.

Referring now to FIGS. 17–24, a third embodiment of the instant invention is shown with a flat wire conductor and with a non-removable lamp assembly. As described earlier, the lamp housing assembly generally comprises a bottom housing 20, a top housing 100, a lamp assembly 34, and conductor wire 68. The bottom housing 20 and the top housing 100 are coupled in interlocking engagement. Snap fit features are molded in the sides of the bottom housing or base 20 and the top housing or cover 100. These snap it features include grooves 70 as defined by the exterior of sides 22 in the base and flanges 124 as defined by sides 102 in the cover. Assisting the snap fit features in their function are alignment recesses 72 in the base 20. These recesses 72 accept guide pins 126 of the cover 100, to align the cover 100 and base 20 and constrain the longitudinal movement of the cover 100 and the base 20 relative to each other. The conductive wire harness 68 interposes the cover 100 and the base 20 as it passes through the housing assembly and is secured therein by guide pins 126.

As described above for the preferred embodiment, in this embodiment the cover has at least two sides 102 and opposite end segments 104, wherein at least one end segment defines an arcuate depression 106. The base has at least two sides 22 and opposite end segments, wherein at least one of the base end segments defines a complimentary arcuate protrusion 24, such that the cover's arcuate depression 106 receives the base's arcuate protrusion 24. The outer surfaces of both the cover and base are rounded edges to avoid puncturing the slide. As described above, the complete housing is formed by the interlocking of the cover 100 and base 20. The cover 100 includes a flange or lip 124 longitudinally disposed along the inner surface of its two sides. The base 20 includes complimentary grooves 70 along the outer surface of its two sides for receiving the flanges 124 of the cover, thereby providing a snap fit feature. As described above, assisting the snap fit feature in its function are alignment openings or recesses 72 in the base and corresponding guide pins 126 in the cover. These recesses 72 accept the guide pins 126 which protrude from the interior of the cover 100 and align the cover 100 and base 20 for assembly. In this embodiment, however, the guide pins 126 engage the flat conductive wire harness 68, piercing the flat conductor wire harness, and securely holding the wire harness within the alignment recesses. In this embodiment, the base does not contain insulation displacement terminals to receive both the flat conductor and the wire lamp leads. Rather, the wire lamp leads are soldered directly to the flat conductor. Furthermore, the cover does not contain wire guide channels, nor is there a lamp compartment with cylindrically recessed levels. However, the snap fit features of this embodiment and of the preferred embodiment are otherwise identical. Furthermore, the cover and base are also identical in that the classical S-shaped strain relief feature is formed, thus maintaining the minimum bend radii for the conductor and insulation used in the wire when the top and bottom housings are snapped together. As previously mentioned, the snap fit feature allows for easy access to the lamp if necessary.

Figure 18:
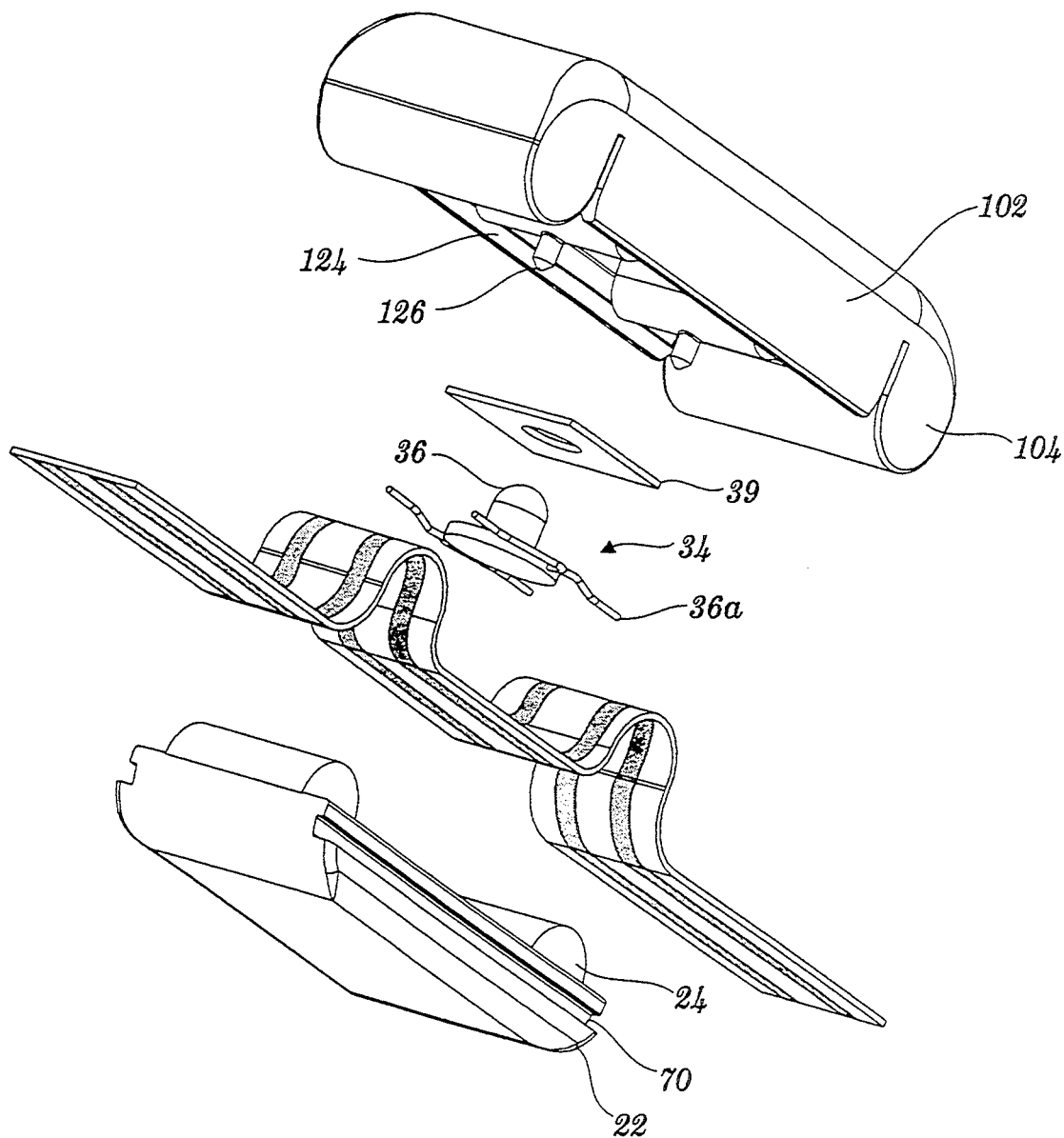
FIG. 18 is an exploded view of the third embodiment of the instant invention.
Figure 19:
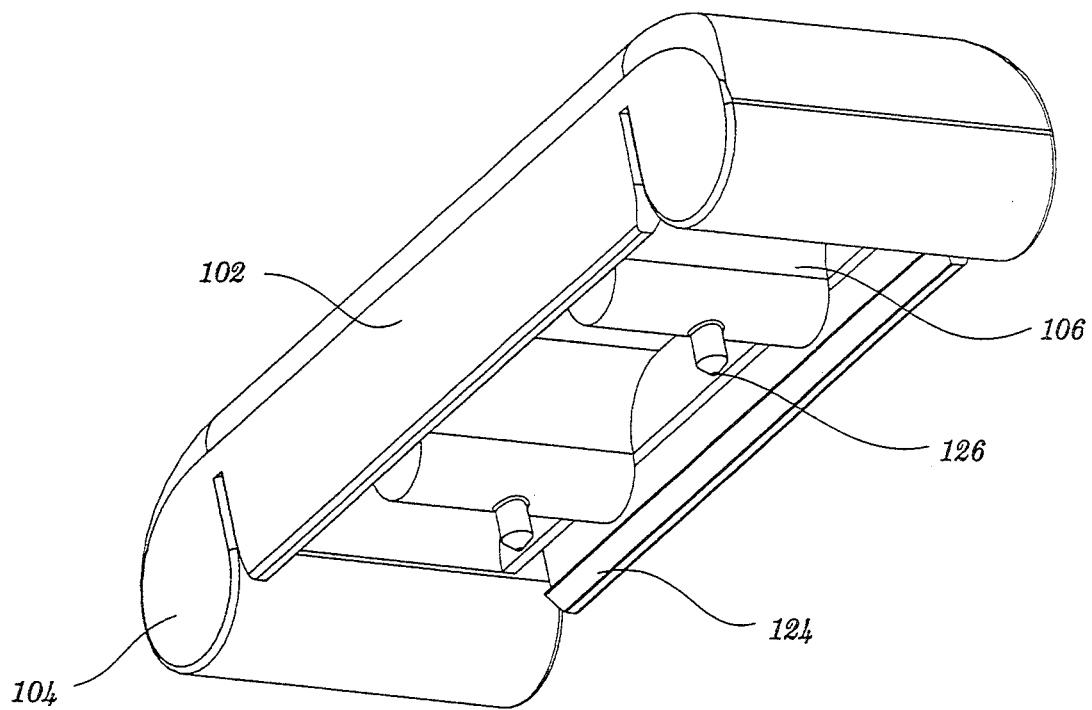
FIG. 19 is a perspective view of the cover of the third embodiment of the instant invention.
Figure 20:
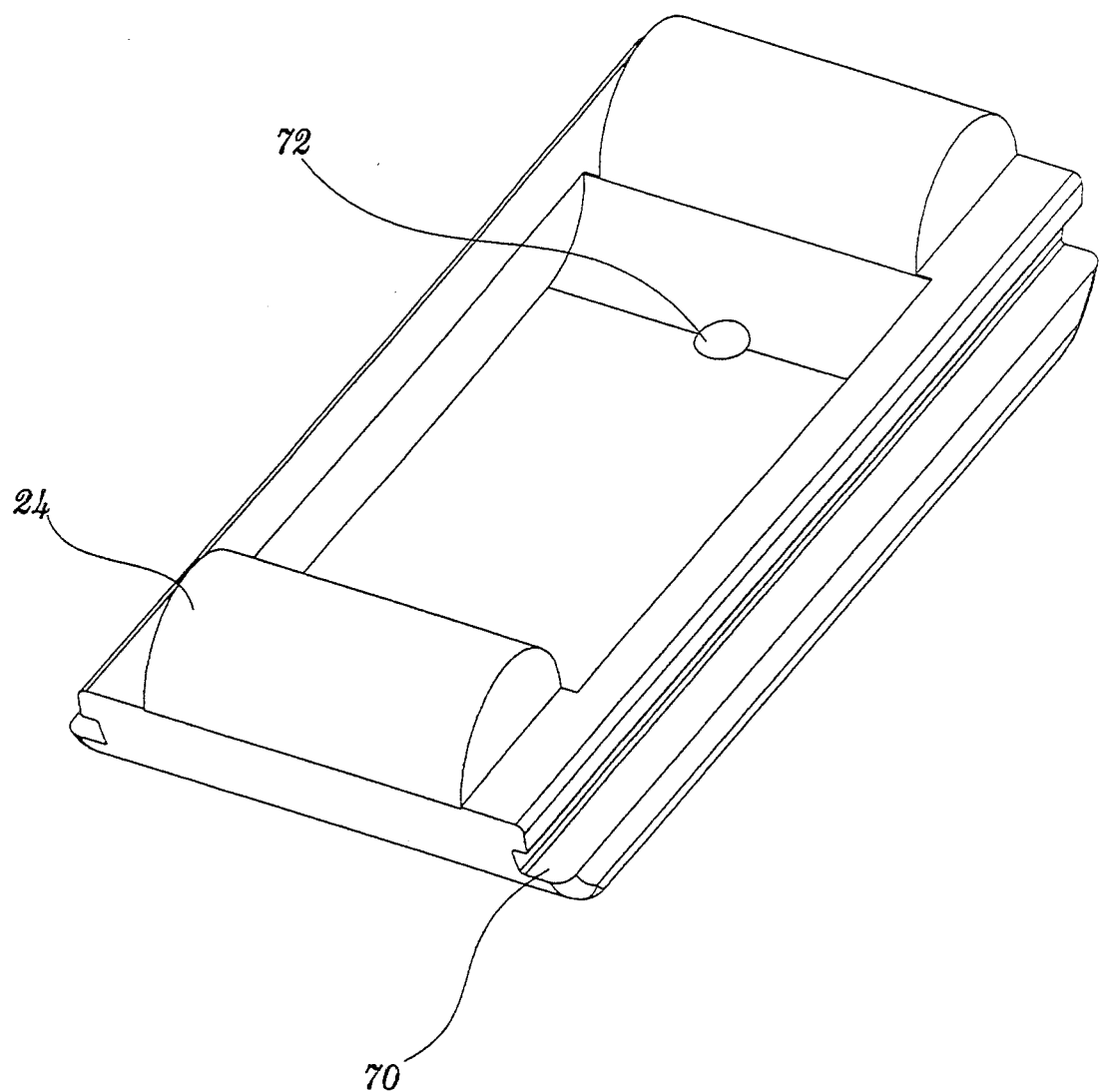
FIG. 20 is a perspective view of the interior portion of the base for the third embodiment.
Figure 22:
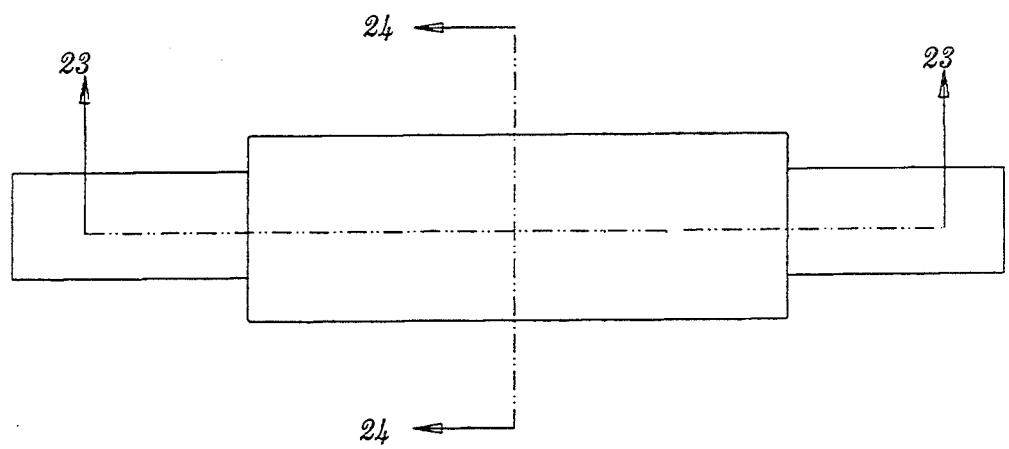
FIG. 22 is a top plan view of the third embodiment.
Figure 21:
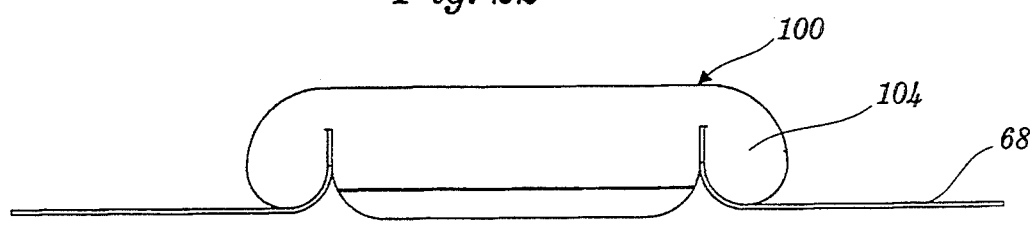
FIG. 21 is a side view of the third embodiment of the lamp housing assembly.
Figure 23:
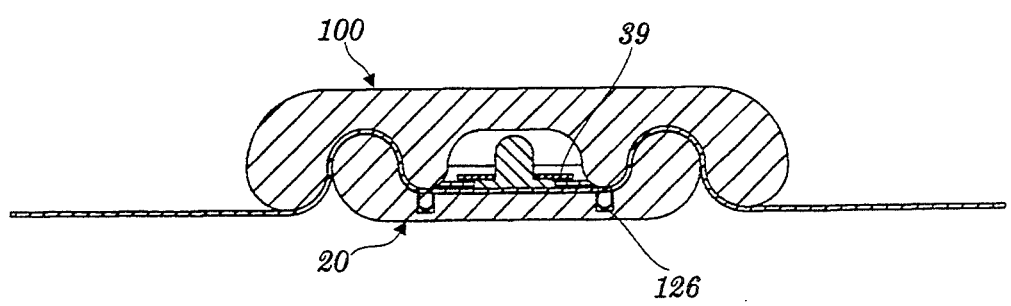
FIG. 23 is a cross sectional view of the third embodiment of the instant invention taken along line 23—23 of FIG. 22.
Figure 24:
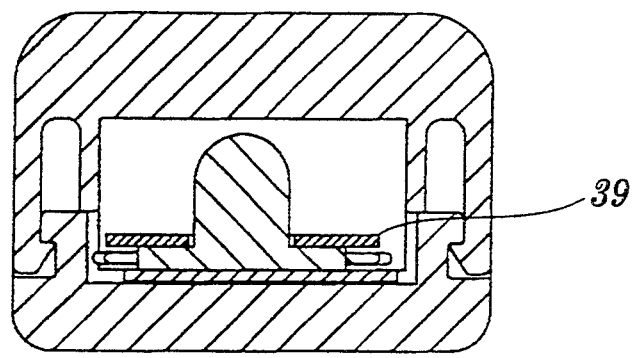
FIG. 24 is a cross sectional view of the alternative embodiment of the lamp housing assembly taken along line 24—24 of FIG. 22.

As seen in FIGS. 18 and 23 a reflector 39 optimizes the light distribution of the lamp 36. As best seen in FIG. 23, an open chamber 123 surrounds the lamp 36 rather than the cylindrically recessed portions described in the preferred embodiment.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A lamp assembly for an evacuation slide of an aircraft, said lamp assembly connected to a power source via a conductive wire harness, said lamp assembly comprising:
   a lamp;
   a conductive wire harness;
   housing means for protecting said lamp and said conductive wire harness;
   said housing means including a cover and a base;
   means for providing interlocking engagement between said base and said cover;
   means for receiving said lamp disposed on a surface of said cover;
   said cover having at least two sides and opposite end segments, at least one said cover end segment defining an arcuate depression;
   said base having at least two sides and opposite end segments, at least one said base end segment defining a corresponding arcuate protrusion which adaptively mates with said arcuate depression when said cover and said base are engaged such that said conductive wire harness is securely interposed said base arcuate protrusion and said cover arcuate depression;
   said cover arcuate depression and said base arcuate protrusion providing strain relief to said conductive wire harness;
   said housing further including means for conductively receiving said conductive wire harness; and
   said conductive wire harness and said lamp being in electrical contact with one another, providing continuity.

2. The lamp assembly of claim 1, wherein said means for providing interlocking engagement comprises:
   a flange about each of said at least two cover sides, said flange being resilient and biasing for recovery after being slightly compressed; and
   a groove in each of said at least two base sides, said groove for receiving said flange, wherein a snap lock fit is achieved between said cover and said base.

3. The lamp assembly of claim 2, wherein said means for providing interlocking engagement further comprises:
   guide pins disposed on an inner surface of said cover; and
   alignment recesses disposed on an inner surface of said base, said alignment recesses accepting said guide pins, aligning said base with said cover and minimalizing longitudinal movement of said cover and said base relative to each other.

4. The lamp assembly of claim 1, wherein said base includes means for releasably receiving and securing said lamp.

5. The lamp assembly of claim 4, wherein said means for releasably receiving and securing said lamp comprises:
   an annular aperture disposed in said base; and
   a conductive lamp turret having a lamp attaching aperture disposed therein, said annular aperture being axially aligned with said lamp attaching aperture, said lamp turret having a recessed area forming a lip.

6. The lamp assembly of claim 5, wherein said means for releasably receiving and securing said lamp further comprises:
   a lamp engagement member for engaging said lip connected to said lamp, said lamp engagement member sized to fit within said lamp attaching aperture.

7. The lamp assembly of claim 6, wherein said lamp engagement member has an interlocking groove disposed thereon, said interlocking groove having a leading edge and a trailing edge, said trailing edge containing a stop, wherein said lamp engagement member engages said lip when said lamp engagement member is rotated.

8. The lamp assembly of claim 1, wherein said cover includes rounded outer surfaces about said opposite end segments, forming a substantially S-shaped strain relief feature.

9. The lamp assembly of claim 1, wherein said means for conductively receiving said conductive wire harness includes splicing terminals disposed on an inner surface of said base for frictionally engaging and removing insulation from said conductive wire harness, providing continuity between said lamp and said conductive wire harness.

10. The lamp assembly of claim 1, wherein said lamp includes a plurality of wire lamp leads, said wire lamp leads being received by said means for conductively receiving said conductive wire harness such that both said conductive wire harness and said wire lamp leads are inserted into wire slots formed by said means for conductively receiving said conductive wire harness, thereby providing continuity between said lamp and said conductive wire harness.

11. The lamp assembly of claim 1, wherein said means for receiving said lamp includes a lamp compartment disposed on an inner surface of said cover.

12. The lamp assembly of claim 11, wherein said lamp compartment comprises a plurality of cylindrically recessed portions of differing diameters.

13. The lamp assembly of claim 1, wherein said cover includes a wire guide channel disposed along an inner surface of said cover, said wire guide channel for capturing said conductive wire harness and holding said conductive wire harness in its intended position within said lamp housing assembly.

14. The lamp assembly of claim 1, wherein said conductive wire harness is a round wire conductor.

15. A lamp assembly for an evacuation slide of an aircraft, said lamp assembly connected to a power source via a conductive wire harness, said lamp assembly comprising:
    a lamp;
    means for receiving said lamp;
    a conductive wire harness;
    housing means for protecting said lamp and said conductive wire harness;
    said housing means including a cover and a base;
    means for providing interlocking engagement between said base and said cover;
    said cover having at least two sides and opposite end segments, at least one said cover and segment defining an arcuate depression, said cover including rounded outer surfaces about said opposite end segments;
    said base having at least two sides and opposite end segments, at least one said base end segment defining a corresponding arcuate protrusion which adaptively mates with said arcuate depression when said cover and said base are engaged such that said conductive wire harness is securely interposed said base arcuate protrusion and said cover arcuate depression;
    said cover arcuate depression and said base arcuate protrusion providing strain relief to said conductive wire harness when adaptively mated;
    said housing further including means for securing said conductive wire harness within said housing; and
    said conductive wire harness and said lamp being in electrical contact with one another, providing continuity.

16. The lamp assembly of claim 15, wherein said means for providing interlocking engagement comprises:
    a flange about each of said at least two cover sides, said flange being resilient and biasing for recovery after being slightly compressed; and
    a groove in each of said at least two base sides, said groove for receiving said flange, wherein a snap lock fit is achieved between said cover and said base.

17. The lamp assembly of claim 16, wherein said means for providing interlocking engagement further comprises:
    guide pins disposed on an inner surface of said cover; and
    alignment recesses disposed on an inner surface of said base, said alignment recesses accepting said guide pins, thereby aligning said base with said cover and minimalizing longitudinal movement of said cover and said base relative to each other.

18. The lamp assembly of claim 15, wherein an S-shaped strain relief feature is formed by the combination of at least one of said rounded outer surfaces and said cover arcuate depression.

19. The lamp assembly of claim 15, wherein said means for securing said conductive wire harness comprises:
    guide pins disposed on an inner surface of said cover; and
    alignment recesses disposed on an inner surface of said base, said alignment recesses accepting said guide pins, said guide pins engaging and piercing said conductive wire harness, securely holding said wire harness within said housing, thereby aligning said base with said cover and minimalizing longitudinal movement of said cover and said base relative to each other.

20. The lamp assembly of claim 15, wherein said means for receiving said lamp includes a lamp compartment disposed on an inner surface of said cover.

21. The lamp assembly of claim 15, wherein said conductive wire harness is a flat wire conductor directly soldered to said lamp.

22. A lamp assembly for an evacuation slide of an aircraft, said lamp assembly connected to a power source via a conductive wire harness, said lamp assembly comprising:
  a lamp;
  a round wire conductor;
  a housing for protecting said lamp and said round wire conductor;
  said housing including a cover and a base, said round wire conductor being interposed said base and said cover;
  said cover having at least two sides and opposite end segments, at least one said cover end segment defining an arcuate depression, said cover including rounded outer surfaces about said opposite end segments;
  a lamp compartment disposed on an inner surface of said cover;
  said base having at least two sides and opposite end segments, at least one said base end segment defining a corresponding arcuate protrusion which adaptively mates with said arcuate depression when said cover and said base are engaged so as to secure said round wire conductor therebetween;
  said cover arcuate depression and said base arcuate protrusion providing strain relief to said round wire conductor;
  a flange about each of said at least two cover sides, said flange being resilient and biasing for recovery after being slightly compressed;
  a groove in each of said at last two base sides, said groove for receiving said flange, forming a snap lock fit between said cover and said base; and
  splicing terminals disposed on an inner surface of said base for frictionally engaging and removing insulation from said round wire conductor, providing continuity between said lamp and said round wire conductor.

23. The lamp assembly of claim 22, further comprising nears for releasably receiving and securing said lamp.

24. The lamp assembly of claim 23, wherein said means for releasably receiving and securing said lamp comprises:
  an annular aperture disposed in said base; and
  a conductive lamp turret having a lamp attaching aperture disposed therein, said annular aperture being axially aligned with said lamp attaching aperture, said lamp turret having a recessed area forming a lip.

25. The lamp assembly of claim 24, wherein said means for releasably receiving and securing said lamp further comprises:
  a lamp engagement member for engaging said lip connected to said lamp, said lamp engagement member sized to fit within said lamp attaching aperture.

26. The lamp assembly of claim 25, wherein said lamp engagement member has an interlocking groove disposed thereon, said interlocking groove having a leading edge and a trailing edge, said trailing edge containing a stop, wherein said lamp engagement member engages said lip when said lamp engagement member is rotated.

27. The lamp assembly of claim 22, wherein said lamp compartment comprises a plurality of cylindrically recessed portions of differing diameters.

28. The lamp assembly of claim 22, wherein said cover includes a wire guide channel disposed along an inner surface of said cover, said wire guide channel for capturing said round wire conductor and holding said round wire conductor in its intended position within said lamp assembly.

29. The lamp assembly of claim 22, further including guide pins disposed on an inner surface of said cover; and
  alignment recesses disposed on an inner surface of said base, said alignment recesses accepting said guide pins, thereby aligning said base with said cover and minimalizing longitudinal movement of said cover and said base relative to each other.

30. The lamp assembly of claim 23, where an S-shaped strain relief feature is formed by the combination of at least one of said rounded outer surfaces and said cover arcuate depression.

31. The lamp assembly of claim 22, wherein said lamp includes a plurality of wire lamp leads, said wire lamp leads being received by said splicing terminals such that both said round wire conductor and said wire lamp leads are inserted into wire slots formed by said splicing terminals, providing continuity between said lamp and said round wire conductor.

* * * * *